United States Patent [19]
Albrecht

[11] Patent Number: 5,268,957
[45] Date of Patent: Dec. 7, 1993

[54] AUTOMATIC CALL-BACK "CAMP-ON" SERVICE FOR COMMUNICATION SYSTEMS

[75] Inventor: John M. Albrecht, Georgetown, Tex.

[73] Assignee: Rolm Company, Santa Clara, Calif.

[21] Appl. No.: 719,895

[22] Filed: Jun. 24, 1991

[51] Int. Cl.⁵ .................... H04M 1/64; H04M 3/42
[52] U.S. Cl. ................................ 379/67; 379/88; 379/201; 379/209; 379/69
[58] Field of Search .............. 379/67, 88, 89, 127, 379/142, 209, 201, 69

[56] References Cited

U.S. PATENT DOCUMENTS

| | | | |
|---|---|---|---|
| 4,926,471 | 5/1990 | Ikeda | 379/142 |
| 4,930,152 | 5/1990 | Miller | 379/67 |
| 5,155,761 | 10/1992 | Hammond | 379/142 |

FOREIGN PATENT DOCUMENTS 0154865 9/1984 Japan.
0284151 11/1989 Japan.

Primary Examiner—James L. Dwyer
Assistant Examiner—Fan Tsang

[57] ABSTRACT

The present invention is directed to a technique for selectively storing a message (or note) by a calling party in a communication system when a call to a called party cannot be completed and an automatic or manual redial function is activated. When a call between two communication devices cannot be completed due to a called communication device being busy or unanswered, the calling party can selectively store a message related to that call when activating the automatic or manual redial function. This message can be stored locally in an intelligent calling communication device, or centrally in a Voicemail system or PBX for non-intelligent communication devices. Where the message is stored locally in an intelligent calling communication device, the message is replayed each time a redial button on the device is depressed. Where the message is stored centrally in a Voicemail system or PBX, the message is replayed to the calling party prior to an automatic redial sequence completing a call.

11 Claims, 4 Drawing Sheets

AUTOMATIC CALL-BACK "CAMP-ON" SERVICE FOR COMMUNICATION SYSTEMS

TECHNICAL FIELD OF THE INVENTION

The present invention is directed to an improvement to communication systems or communication devices which provide for automatic or manual completion, i.e., redialing, of a call after a called communication device is found busy.

BACKGROUND OF THE INVENTION

In recent years communication systems have added many new services for consumer use. One such new service is a voice-messaging service which is provided by Voice Messaging System to a called party whenever the called party is unavailable. More particularly, this service is in widespread use to leave a voice message for a called party whenever a telephone call cannot be completed. In fact, the use of a voice messaging system may be more efficient than telephone conversations where participation of the two parties to a call is not required to transfer simple information. Voice messaging can be considered a replacement for a human attendant who would otherwise be required to transcribe the message, or for the simple analog recording device that can be connected to a called telephone. In this regard see, for example, the article "A Voice Message System" by D. Cohen in *Computer Message Systems*, edited by R. P. Uhlig, Proceeding of the IFIP TC-6 International Symposium On Computer Message Systems, Ottawa, Canada, 6-8 April 1981, North Holland Publishing Co., at pages 17-28; the article, "An Experimental Voice-Message System Controlled By Word Recognition" by P. Mermelstein et al. in *Computer Message Systems*, edited by R. P. Uhlig, Proceeding of the IFIP TC-6 International Symposium On Computer Message Systems, Ottawa, Canada, 6-8 Apr. 1981, North Holland Publishing Co., at pages 29-34; and the article "Voice Mail and Competing Services" by Dr. I. Gitman in *Computer Message Systems*, edited by R. P. Uhlig, Proceeding of the IFIP TC-6 International Symposium On Computer Message Systems, Washington, D.C., 5-7 Sep. 1985, North Holland Publishing Co., at pages 405-410.

Another new service is an automatic call-back service which provides automatic call-back to effect completion of a call within a predetermined zone of communication, e.g., within a company location, whenever a called party's phone is initially found busy. Automatic call-back service is provided by various systems termed, for example, a "Voicemail system" which forms part of a communication system. With such service, when a calling party makes a call and finds that the called number is busy, the calling party can activate the Voicemail system to automatically complete that call whenever the other telephone is placed on-hook without further involving the calling party. A typical procedure for initiating such automatic call-back service is for the calling party to depress a predetermined button on the telephone or to transmit a predetermined code (e.g., the code *77) using the telephone keypad once the calling party determines that the called party is busy. The predetermined code transmitted by pressing one or more buttons is received by the communication system. The communication system notifies the Voicemail system of such automatic call-back request and transmits the called and calling number for storage in predetermined memory locations of the Voicemail system. The communication system returns a predetermined tone or tone sequence to the calling party to inform the calling party that the automatic call-back of that call has been activated. The calling party then hangs up to continue with other business.

The equipment in the Voicemail and communication systems periodically interrogate the called number until it is found on-hook. Once the called number is found on-hook, the Voicemail system tries to complete the call by ringing the calling party and then the called party. Should the calling party be off-hook at that time, the communication system tries again to complete the call when both parties are found on-hook. The problem with such automatic call-back completion is that if the called and calling parties are found busy for a long period of time, the calling party may have forgotten the main purpose of the original call when the call is finally completed. It is, therefore, desirable to provide a reminder of a purpose or element of the call to the calling party at the time a call is completed.

SUMMARY OF THE INVENTION

The present invention is directed to a technique for use with a call-back (or redial) service that refreshes a calling party's memory as to the purpose, or any other element, of a call just prior to its automatic completion with a called party. More particularly, the present invention is directed to a method of redialing a called communication device which is found busy after a call has been placed in a communication system. In a first step of the method a determination is made at a calling communication device if a message concerning a non-completed completed call is desired upon finding the called communication device busy. In a second step, the message concerning the non-completed call provided at the calling communication device is selectively stored in a predetermined memory section. In a third step, a subsequent redialing of a called communication device's number previously found busy is invoked. In a fourth step, in response to the third step, a determination is made whether a message was stored in the second step, and the message is played back to the calling communication device prior to the call being completed.

In an embodiment of the present invention where the communication system comprises centralized automatic redialing equipment, then prior to making a determination at a calling communication device whether a message concerning a non-completed call is desired in the first step described hereinabove, the following steps are performed. First, the party at the calling communication device transmits a predetermined code for invoking a camp-on to the centralized automatic redialing equipment once the called communication device is found busy Second, in response to invoking the camp-on, a predetermined instruction is transmitted from the centralized automatic redialing equipment to the calling communication device defining a first code to be transmitted by the calling communication device when a message is to be stored, and a second code when a message is not to be stored.

In another embodiment of the present invention, the calling communication device comprises redial and a voice or data Random Access Memory (RAM) module or other appropriate memory mechanism such as an analog information storage device. With such calling communication device, in performing the second, third, and fourth steps described hereinabove, the following steps are performed. In the second step described hereinabove, the message which is provided at the calling communication device concerning the not completed call is selectively stored in the RAM module of the calling communication device. In the third step described hereinabove, a subsequent redialing of the called communication device's number which was previously found busy or unanswered is invoked using the redialing equipment of the calling communication device. In the fourth step described hereinabove, the message stored in the RAM module of the calling communication device is played back to a receiver of the calling communication device in response to performing the third step hereinabove.

The invention will be better understood from the following more detailed description taken with the accompanying drawings and claims.

DETAILED DESCRIPTION

Figure 1:
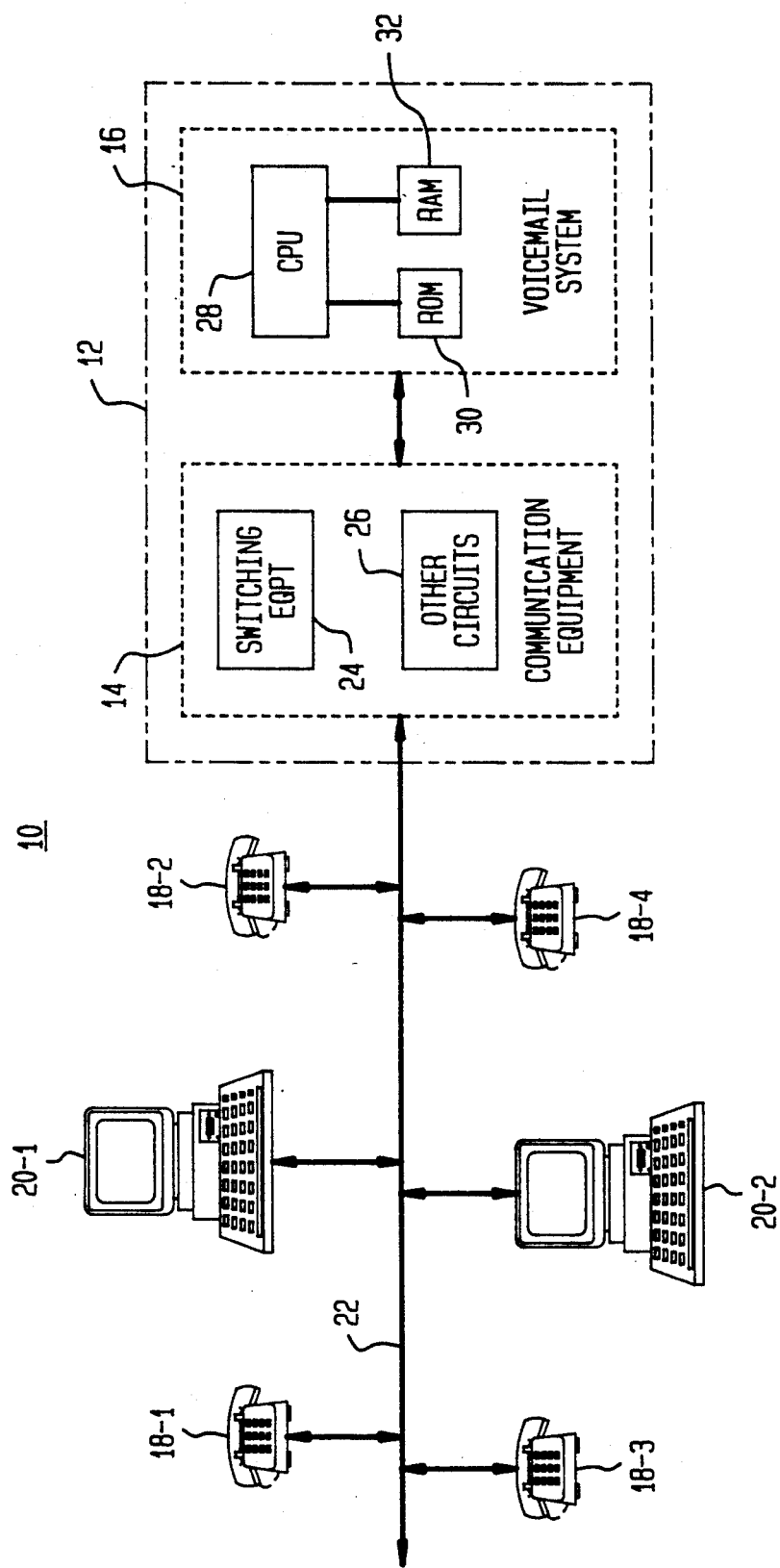
FIG. 1 is a block diagram of a exemplary prior art automatic call-back completion system as found in a typical communication system.

Referring now to FIG. 1, there is shown an exemplary communication system 10 comprising Central Office (CO) or Private Branch Exchange (PBX) 12 (shown within a dashed-line box) comprising communication equipment 14 (shown within a dashed-line box), exemplary Voicemail system 16 (shown within a dashed-line box), and a plurality of communication devices comprising telephones 18 (there being shown telephones 18-1, 18-2, 18-3 and 18-4), and computers 20 (there being shown computers 20-1 and 202) which are connected to the communication equipment 14 by separate wire pairs in a cable 22. It is to be understood that communication equipment 14 comprises switching equipment 24 and other circuits 26 needed to complete a call between a subscriber of one of telephones 18-1 to 18-4 or computers 20-1 and 20-2 and another one of said telephones or computers. Additionally, the number of telephones 18 and computers 20 provided are merely for illustrative purposes, and it is to be understood that more than four telephones 18 and two computers 20 (or other communication devices) can be used in communication system 10. The communication devices can also comprise other devices than just telephones and computer as, for example, facsimile machines with associated telephones.

Voicemail system 16 functions in part as a centralized automatic redialing system and comprises central processing unit (CPU) 28 which is coupled to Read Only Memory (ROM) 30 and to Random Access Memory (RAM) 32. ROM 30 stores a program (not shown) for providing, for example, a prior art "camp-on" service to subscribers within communication system 10, while RAM 32 acts as a scratchpad memory for storing information needed by the program of Voicemail system 16 to execute the "camp-on" service. The "camp-on" service is defined as an automatic call-back (redial) function where when a caller (calling party) makes a call and finds that the called number (called party) is busy, the caller can activate Voicemail system 16 to automatically complete that call when the called party's communication device 18 or 20 is placed on-hook without further involving the caller. Where communication equipment 14 comprises a CPU (not shown) with its associated memories (not shown) as part of the other circuits 26, it is to be understood that the functions described herein for the CPU 28, ROM 30, and RAM 30, and RAM 32 shown in the Voicemail system 16 can be performed instead by the CPU and the associated memories of the other circuits 26 in the communication equipment 14 without the need for the CPU 28. ROM, 30, and RAM 32 in the Voicemail system 16.

In operation, whenever a caller at, for example, telephone 18-1 wishes to call a person at, for example, telephone 18-4, the caller keys in the telephone number of telephone 18-4. The keyed-in telephone number is transmitted to communication equipment 14 over a pair of wires (not shown) forming part of cable 22. As is well known in the art, communication equipment 14 performs many functions such as storing the called and calling number, searching for a path through switching equipment 24, and determining the status of called telephone 18-4 and calling telephone 18-1. If other circuits 26 find that called telephone 18-4 is busy, a busy tone is returned over the pair of wire of cable 22 to calling telephone 18-1.

At this time the calling party at telephone 18-1 can activate the "camp-on" service of Voicemail system 16 by depressing a predetermined button on telephone 18-1 or by keying in a predetermined code (e.g., *77). Once the "clamp-on" code is received by communication equipment 14 from telephone 18-1, communication equipment 14 notifies Voicemail system 16 of the "camp-on" request, and transfers the called and calling telephone numbers to Voicemail system 16.

When Voicemail system 16 receives the called and calling telephone numbers, CPU 28, under the control of the program stored in ROM 30, causes both telephone numbers to be stored in predetermined memory locations of a predetermined queue or list (not shown) in RAM 32. A tone is usually provided back to calling party telephone 18-1 over cable 22 to indicate that the "camp-on" service has been activated. Calling party telephone 18-1 can then be placed on-hook. CPU 28 subsequently accesses the queue or list in RAM 32 and interrogates communication equipment 14 to determine if any of the calls in the queue or list can be completed. Once telephone 18-4 is found on-hook, Voicemail system 16 provides predetermined information to communication equipment 14 in an attempt to complete the call between telephones 18-1 and 18-4.

Figure 2:
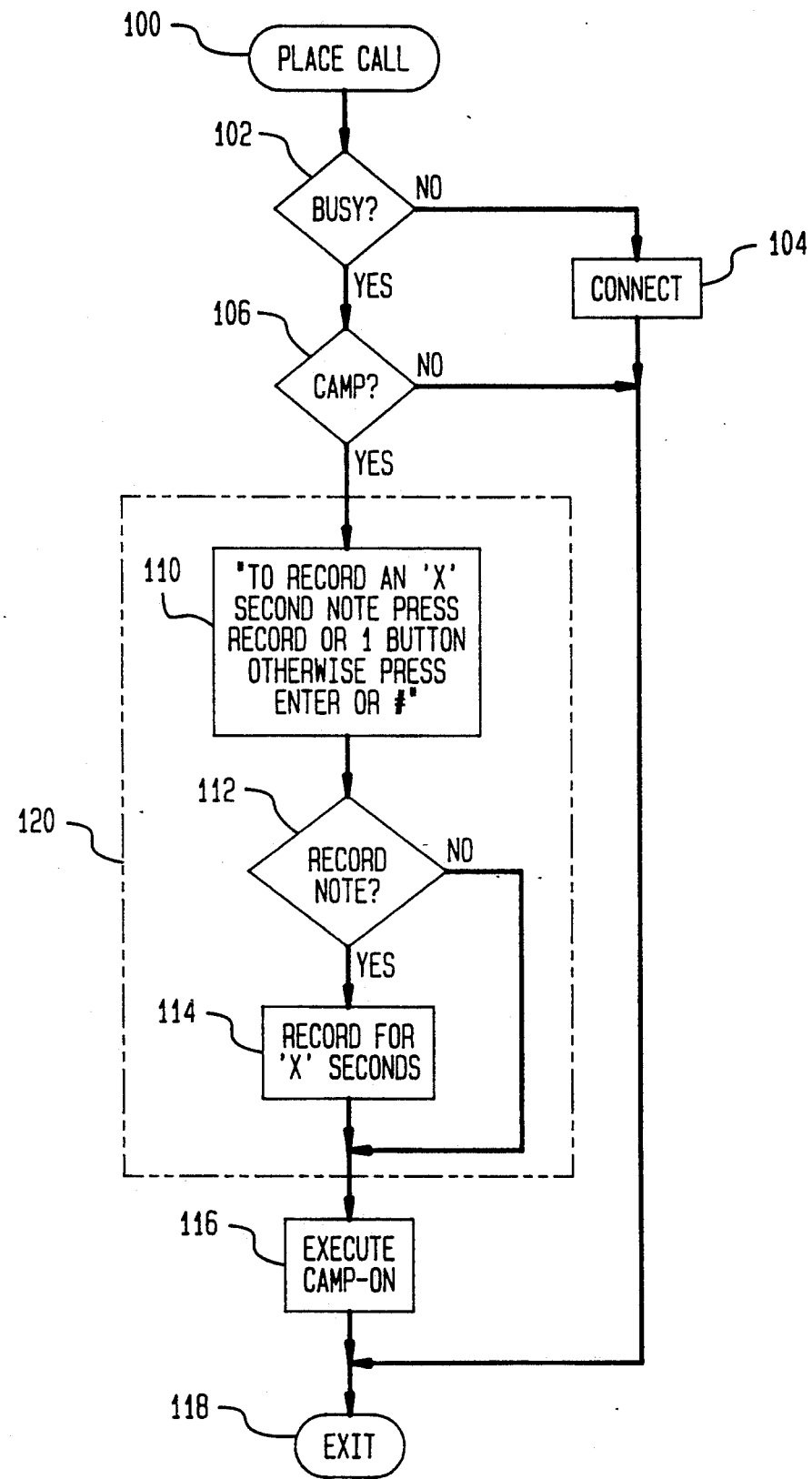
FIG. 2 is a flow chart of an exemplary sequence of steps for invoking a Voicemail "camp-on" service and the selective storage of a message by a calling party in accordance with the present invention where a centralized Voicemail system exists.

Referring now to FIG. 2, there is shown a flow chart of exemplary steps performed by communication equipment 14 and CPU 28 of Voicemail system 16 to invoke both the "camp-on" service and a selective voice-recorded message by a calling party in accordance with the present invention. Whenever a calling party places a call to a called party (designated in block 100), the sequence of steps proceeds to block 102 to determine whether the called telephone is idle or busy. If the called telephone is found idle or on-hook (N decision from block 102), the sequence of steps proceeds to block 104 and the call is connected between the two parties before proceeding to block 118 to exit the sequence. If the called telephone is found busy or off-hook (Y decision from block 102), the sequence of steps proceeds to block 106 where the calling party must make decision of whether to a initiate a camp-on or not. If the camp-on initiation is not desired (N decision from block 106), the calling party goes on-hook and the call progresses to the exit block 118. If the camp-on initiation is desired (Y decision from block 106), the calling party depresses one or more predetermined buttons on the telephone to transmit the appropriate code to the communication equipment 14.

Once camp-on is initiated in block 106, a sequence of steps 110, 112 and 114, which are shown within a dashed line block 120, are performed in accordance with the present invention. More specifically, a Y decision from block 106 directs the sequence to block 110 where a message is returned to the calling party telephone as shown by the exemplary message "to record an 'x' second note press the record or 1 button, otherwise depress the enter or # button." It is to be understood that "x" denotes a predetermined period of time (e.g., 10 second). The sequence of steps then proceeds to block 112 where the calling party has to make the decision of whether to record the note or not for subsequent playback to the calling party when the call is completed. Such decision is made by depressing the designated button denoted in the message of block 110. If the callinq party does not want to record a note (N decision from block 112), the call proceeds to block 116 to execute the camp-on (automatic call back) service, and then to the exit block 118.

If the calling party desires to record an "x" second note (Y decision from block 112), the sequence of steps proceeds to block 114 where an indication (e.g., a tone) to proceed is sent back to the calling party. The calling party then transmits the note which is stored in, for example, RAM 32 of Voicemail system 16. The camp-on is then executed in block 116 before proceeding to exit block 118. It is to be understood that blocks 110, 112, and 114, within dashed-line block 120, represent the functions added to the prior art camp-on service in accordance with the present invention. More particularly, in the prior art camp-on service the sequence of steps would proceed directly to the execute camp-on block 116 once the appropriate code has been keyed-in in block 106.

Figure 3:
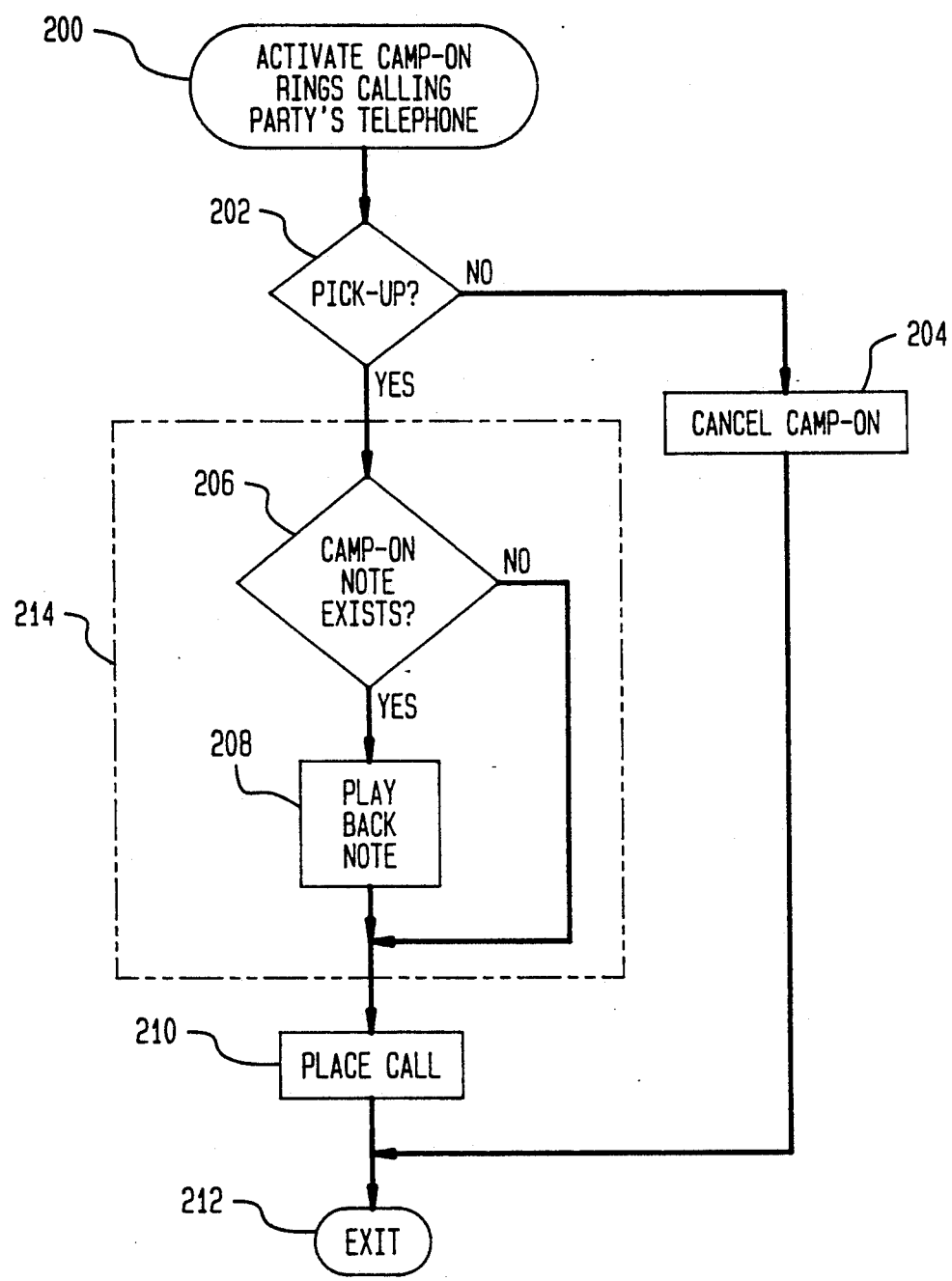
FIG. 3 is a flow chart of an exemplary sequence of steps for activating the "camp-on" prerecorded message stored in FIG. 2 for return to the calling party prior to the completion of an automatically redialed call by a centralized Voicemail system in accordance with the present invention.

Referring now to FIG. 3, there is shown a flow chart of exemplary steps for activating the prerecorded "camp-on" message for transmission to the calling party prior to the completion of an automatic call-back call in accordance with the present invention. Whenever the called party telephone is found on-hook by Voicemail system 16 by interrogating communication equipment 14, the camp-on sequence is activated and a ringing signal is supplied to the calling party's telephone as shown in block 200. The sequence of steps then proceeds to block 202 where CPU 28 makes a decision as to whether the calling party's telephone is answered (picked up) or not. If the calling party's telephone is not answered (N decision from block 202), the sequence of steps proceeds to block 204 to terminate the current camp-on routine, and then to exit block 212. The automatic call-back (camp-on) routine of FIG. 3 is repeated at subsequent periods of time until the call is completed or the camp-on service is subsequently cancelled by the calling party by keying in a predetermined code (not shown).

If the calling party picks up the telephone (Y decision from block 202), the sequence of steps proceeds to block 206 where Voicemail system 16 decides whether a camp-on note exists (was prerecorded in block 114 of FIG. 2) or not. If a camp-on note exists (Y decision from block 206) the sequence of steps proceeds to block 208 where the prerecorded note is played back to the calling party before the call is placed to the called party in block 210. If a camp-on note does not exist (N decision from block 206), the sequence of steps proceeds to block 210 to place the call to the called party. Once the call is completed, the sequence of steps is exited in block 212. It is to be understood that blocks 206 and 208, within dashed-line block 214, represent the functions added to the prior art camp-on service in accordance with the present invention. More particularly, in the prior art camp-on service the sequence of steps would proceed directly from block 202 to block 210 to place the call to the called party once the calling party picked up the telephone.

With regard to completing an automatic call-back call between computers 20-1 and 20-2 of FIG. 1 or facsimile machines (not shown), the sequence of steps is the same. More particularly, if a call between two computers cannot be initially completed, a note can be left by a calling computer by storing the note either in the memory of that computer or in RAM 32 of Voicemail system 16. Additionally, where a telephone is associated with a computer or a facsimile (FAX) machine, a verbal note from the calling telephone is stored in Voicemail system 16 for return to the calling telephone before the call between computers or FAXs are subsequently completed. A previously stored note would either appear on the screen of a computer or be provided verbally over an associated telephone, where present, of the computer or FAX.

The present invention can be incorporated within a local intelligent telephone (e.g., telephones 18-1 to 18-4 of FIG. 1) as opposed to being incorporated in a Voicemail system. Such embodiment is described hereinbelow. With the use of such local intelligent telephones a Voicemail system is not required for automatic call-back service.

Figure 4:
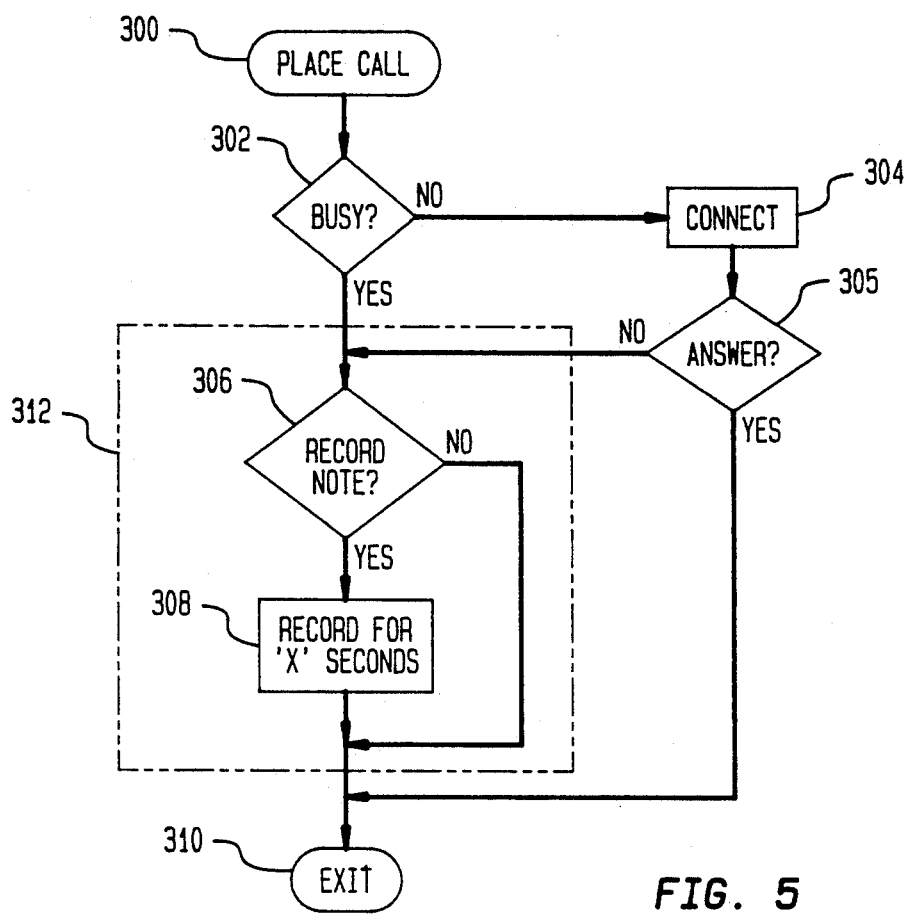
FIG. 4 is a flow chart of an exemplary sequence of steps for selectively storing a message in a local intelligent communication device by a calling party when a call cannot be completed in a accordance with the present invention.

Referring now to FIG. 4, there is shown a sequence of steps for use in a local intelligent communication device (e.g., a telephone as shown for telephone 18-3 in FIG. 1) which has redial capability and a voice or data RAM module 18c (shown in FIG. 1) accessed by Processor (PROC. shown in FIG. 1) or other appropriate memory mechanism such as an analog information storage device. More particularly, in a first step, shown in block 300, the local intelligent communication device places a call. The sequence of steps proceeds to block 302 where a determination is made of whether the called communication device is busy or not. When the called communication device 18-3 is not busy (N decision from block 302), the call is connected (block 304) and the sequence of steps proceeds to block 305 where a determination is made of whether the called party answers or not. When the called party answers (Y decision from block 305), the sequence proceeds to the exit block 310 since the call is established. Where the called communication device is busy (Y decision from block 302) or does not answer the call (N decision from block 305), the sequence of steps proceeds to block 306 where the calling party makes a determination of whether to record a note or not regarding the non-completed call. Where a note is not desired to be recorded (N decision from block 306), the sequence of steps proceeds to the exit block 310. Where a note is desired to be recorded (Y decision from block 306), the note is provided by the calling party and recorded (block 308) within the RAM module 18a (shown in FIG. 1) in the communication device itself. The sequence of steps then concludes by proceeding to the exit block 310. It is to be understood that the blocks 306 and 308, within the dashed-line block 312, represent the functions added to the prior art redialing functions of an intelligent communication device in accordance with the present invention.

Figure 5:
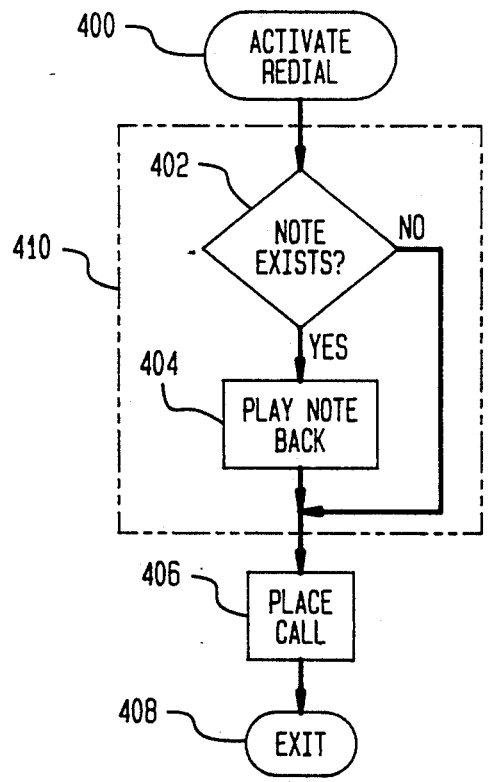
FIG. 5 is a flow chart of an exemplary sequence of steps for redialing a previously called number by a local intelligent communication device, and replaying a previously recorded message to a calling party in accordance with the present invention.

Referring now to FIG. 5, there is shown a sequence of steps for the redialing of a previously non-completed call at a local intelligent telephone 18-3 and other communication devices after performing the steps of FIG. 4. More particularly, the sequence of steps starts at block 400 where the calling party at the local intelligent communication device activates the redial function (via block 18a in FIG. 1). In block 402 a determination is made by the communication device as to whether a prerecorded note exists or not. If a prerecorded note does not exist (N decision from block 402), the sequence of steps proceeds to block 406 to place the call and then exit the sequence in block 408. If a prerecorded note exists (Y decision from block 402), the note is played back (block 404) to the calling party at the local communication device before the call is placed in block 406. The sequence is then exited in block 408. It is to be understood that blocks 402 and 404, within the dashed-line block 410, represent the functions added to the prior art local intelligent communication device 18-3 in accordance with the present invention. When comparing FIGS. 3 and 5, instead of a non-completed call being automatically redialed by Voicemail system 16 (block 200 of FIG. 3), the calling party must depress the redial button (block 400 in FIG. 5) each time the call is redialed until the called party is found on-hook and answers the call. With such local intelligent communication device, each time the redial button is depressed, the prerecorded note stored in the RAM module 18c of FIG. 1 (block 308 of FIG. 4) is played back (in block 404 of FIG. 5) to the calling party.

What is claimed is:

1. A method of establishing a second call between a calling and a called communication device in a communication system once a first call is not completed, comprising the steps of:
   (a) determining at the calling communication device if a message concerning the not completed first call is desired upon finding the called communication device busy or unanswered;
   (b) selectively storing the message relating to the first call which is provided at the calling communication device in a predetermined memory section; and
   (c) invoking a subsequent redialing of a number of the called communication device previously found busy or unanswered
   (d) in response to step (c) by determining if a message was stored in step (b), and playing the message back to the calling communication device prior to redialing the number of the called communication device in order to attempt to complete the second call 2. The method of claim 1 wherein the communication system comprises centralized automatic redialing equipment, and in performing step (a), performing the substeps of:
   (a1) transmitting a predetermined first coded signal by the calling communication device for invoking an accessing of the centralized automatic redialing equipment once the called communication device is found busy or unanswered during the first call; and
   (a2) in response to invoking an accessing in step (a1), accessing in step (a1), transmitting a predetermined instruction from the centralized automatic redialing equipment to the calling communication device defining a second coded signal to be transmitted by the calling communication device when a message is to be stored and a third coded signal when a message is not to be stored.

3. The method of claim 2 wherein in performing step (c), performing the substeps of:
   (c1) prior to performing the determining if a message was stored in step (b), playing back the stored message, and redialing the number of the called communication device, testing by the centralized automatic redialing equipment to determine if the calling and the called communication devices are not busy, and terminating the attempt to establish the second call when either one of the calling communication device or the number of the called communication device is found busy or unanswered;
   (c2) in response to step c(1), re-invoking a subsequent redialing of the number of the called communication device to establish a third call to the called communication device; and
   (c3) reiterating step (c2) until the calling and called number are concurrently found not busy.

4. The method of claim 1 wherein in performing step (c), performing the substeps of:
   (c1) prior to performing the determining if a message was stored in step (b), playing back the stored message, and redialing the number of the called communication device, testing by the centralized automatic redialing equipment to determine if the calling and the called communication devices are not busy, and terminating the attempt to establish the second call when the calling communication device or the number of the called communication device is found busy or unanswered;
   (c2) in response to step (c1), re-invoking a subsequent redialing of the number of the called communication device to establish a third call to the called communication device; and
   (c3) reiterating step (c2) until the calling and called number are concurrently found not busy.

5. The method of claim 1 wherein the calling communication device comprises memory and redialing equipment, the method further comprising the steps of:

(d) in step (b), selectively storing the message concerning the non-completed first call in the memory equipment of the calling communication device;

(e) in step (c), invoking a subsequent redialing of the called communication device's number which was previously found busy or unanswered using the redialing equipment of the calling communication device, and (g) playing the message stored in the memory of the calling communication device back to a receiver of the calling communication device.

6. A method of establishing a second call between a calling and a called communication device once a first call is initially not completed in a communication system having centralized automatic redialing equipment, the method comprising the steps of:

(a) transmitting a first predetermined coded signal from the calling communication device to the centralized automatic redialing equipment for invoking an accessing of the centralized automatic redialing equipment in response to the first call not being completed;

(b) determining at the calling communication device if a message concerning the not completed first call is to be stored upon finding the called communication device busy or unanswered, and transmitting (i) a second predetermined coded signal to the centralized automatic redialing equipment when a message is to be stored and (ii) a third predetermined coded signal to the centralized automatic redialing equipment when a message is not to be stored;

(c) selectively storing the message which is provided at the calling communication device concerning the not completed first call in a predetermined memory section of the centralized automatic redialing equipment; and (d) the centralized automatic redialing equipment invoking a subsequent redialing of a number of the called communication device previously found busy or unanswered;

by determining if a message was stored in step (c), and playing the message back to the calling communication device prior to redialing the number of the called communication device in order to attempt to complete the second call.

7. The method of claim 6 further comprising the step of:

(e) prior to performing step (b), transmitting a predetermined instruction from the centralized automatic redialing equipment to the calling communication device defining the second predetermined coded signal to be transmitted by the calling communication device when a message is to be stored and the third predetermined coded signal when a message is not to be stored.

8. The method of claim 7 wherein in performing step (d), performing the substeps of:

(d1) prior to the determining if a message was stored in step (c), playing back the stored message, and redialing the number of the called communication device, testing by the centralized automatic redialing equipment to determine if the calling and the called communication devices are not busy, and terminating the attempt to establish the second call by the centralized automatic redialing equipment when either one of the calling communication device or the called communication device's number is found busy or unanswered;

(d2) in response to step (d1), re-invoking at the centralized automatic redialing equipment a subsequent redialing of the number of the called communication device to establish a third call to the called communication device; and (d3) reiterating step (d2) until the calling and called communication devices are concurrently found not busy.

9. The method of claim 6 wherein in performing step (d), performing the substeps of:

(d1) prior to the determining if a message was stored in step (c), playing back the stored message, and redialing the number of the called communication device, testing be the centralized automatic redialing equipment to determine if the calling and the called communication devices are not busy, and terminating the attempt to establish the second call by the centralized automatic redialing equipment when either one of the calling communication device or the called communication device's number is found busy or unanswered;

(d2) in response to step (d1), reinvoking at the centralized automatic redialing equipment a subsequent redialing of the number of the called communication device to establish a third call to the called communication device; and (d3) reiterating steps (d1) and (d2) until the calling and called number are concurrently found not busy.

10. A method of establishing a second call between a calling and a called communication device once a first call is initially not completed in a communication system where the calling communication device is a local intelligent communication device that has redial and memory capability, the method comprising the steps of:

(a) determining at the calling communication device if a message concerning the not completed first call is to be stored in the memory when the called communication device is found busy or unanswered;

(b) selectively storing the message which is provided at the calling communication device concerning the not completed first call in a predetermined section of the memory; and (c) invoking a redialing of a called communication device's number previously found busy or unanswered at the redialing equipment by depressing a predetermined button at the calling communication device, and depressing the button, determining if a message was stored in step (b), and playing the message back to a receiver of the calling communication device prior to redialing the number of the called communication device in order to attempt to establish the second call.

11. The method of claim 10 further comprising the step of:

(d) reiterating steps (c) and (d) until the called communication device is found not busy when the attempt to establish the second call is not successful.

* * * * *